US008665897B2

(12) United States Patent
Polland et al.

(10) Patent No.: US 8,665,897 B2
(45) Date of Patent: Mar. 4, 2014

(54) SYSTEMS AND METHODS FOR HIGH-SPEED DIGITAL SUBSCRIBER LINE SOFTWARE DOWNLOAD

(75) Inventors: Joe Polland, Eden Prairie, MN (US); Xinkuan Zhou, Shekou (CN); Laxman Anne, Eden Prairie, MN (US); Manish Sharma, Eden Prairie, MN (US); Clifton Powers, Raleigh, NC (US); Yiu Lam Chan, Shakopee, MN (US)

(73) Assignee: ADC DSL Systems, Inc., Shakopee, MN (US)

( * ) Notice: Subject to any disclaimer, the term of this patent is extended or adjusted under 35 U.S.C. 154(b) by 742 days.

(21) Appl. No.: 12/605,858

(22) Filed: Oct. 26, 2009

(65) Prior Publication Data
US 2011/0099546 A1  Apr. 28, 2011

(51) Int. Cl.
*H04J 3/16* (2006.01)
(52) U.S. Cl.
USPC ............................ 370/437; 370/433; 370/443
(58) Field of Classification Search
USPC ......... 370/222, 227, 352, 437, 431, 433, 438, 370/439, 442, 443, 458, 464–474; 709/203, 709/207, 215, 219
See application file for complete search history.

(56) References Cited

U.S. PATENT DOCUMENTS

| 7,430,626 | B2 |   | 9/2008  | Hedin |
| 7,542,757 | B2 | * | 6/2009  | Fishman et al. ............... 455/419 |
| 7,570,686 | B2 | * | 8/2009  | Krinsky et al. ................ 375/222 |
| 7,856,036 | B2 | * | 12/2010 | Polland et al. ................ 370/498 |
| 7,957,356 | B2 | * | 6/2011  | Wang et al. .................... 370/338 |
| 8,031,707 | B2 | * | 10/2011 | Lewin et al. ................... 370/389 |
| 8,073,955 | B1 | * | 12/2011 | Gagnon et al. ................ 709/227 |
| 2003/0063600 | A1 |   | 4/2003 | Noma |
| 2004/0073902 | A1 | * | 4/2004 | Kao et al. ..................... 717/171 |
| 2006/0274824 | A1 |   | 12/2006 | Kroninger |
| 2007/0067763 | A1 |   | 3/2007 | Sonbarse et al. |
| 2007/0154009 | A1 | * | 7/2007 | Cameron et al. ......... 379/373.02 |
| 2008/0043713 | A1 | * | 2/2008 | Komatsu ....................... 370/349 |
| 2008/0059640 | A1 | * | 3/2008 | Oka et al. ..................... 709/228 |
| 2008/0095188 | A1 |   | 4/2008 | Remy |
| 2009/0041103 | A1 | * | 2/2009 | Shi ................................ 375/222 |

OTHER PUBLICATIONS

International Searching Authority, "International Search Report", Jun. 23, 2011, Published in: WO.

* cited by examiner

*Primary Examiner* — Huy D Vu
*Assistant Examiner* — Kuo T Chiang
(74) *Attorney, Agent, or Firm* — Fogg & Powers LLC (57) ABSTRACT

System and methods for High-speed Digital Subscriber Line Software Download are provided. In one embodiment, a Digital Subscriber Line (DSL) Transceiver Unit is provided. The transceiver unit comprises at least one DSL transceiver, wherein the at least one DSL transceiver implements an Embedded Operations Channel (EOC) and a data path over at least one DSL pair; a first memory for storing a software file for transfer over the DSL pair, wherein the software file comprises a header and at least one file record; and a second memory for storing a provisioning table, wherein the provisioning table establishes timeslot allocations for a plurality of channels communicated over the data path, including provisions for a software download channel for transmitting the software file from the first memory to a target unit over the data path.

20 Claims, 8 Drawing Sheets

SYSTEMS AND METHODS FOR HIGH-SPEED DIGITAL SUBSCRIBER LINE SOFTWARE DOWNLOAD

BACKGROUND

World Digital Subscriber Line (DSL) provides digital data transmission over the wires of a telephone network. World DSL is regularly updated with new software releases that provide additional features and functionality. Downloading these upgrades can be time consuming, costly, and often require upgrading each unit within a span. One method of upgrading a unit is achieved by visiting the physical location of each unit and upgrading the unit while present. The unit is physically removed from its housing slot, the memory is removed and reprogrammed with a new software version, and the upgraded unit is returned to its slot. An employee of the telephone company typically has to visit the location, which are often down manholes.

Another method of upgrading remote units is to download the new software version upgrades from a central office site via a DSL Embedded Operations Channel (EOC). EOC is a small amount of bandwidth defined in the DSL standard that is allocated with the DSL frame to create a virtual channel. However, downloading updates over DSL EOC is prohibitively slow, as the EOC channel runs at less than 4 Kbps and object files can be greater than 1 Megabyte (MB). Therefore, physically visiting each unit and upgrading the unit while present or downloading the upgrades over DSL EOC is time consuming and costly.

For the reasons stated above and for other reasons stated below which will become apparent to those skilled in the art upon reading and understanding the specification, there is a need in the art for a faster download mechanism on the SHDSL data path.

SUMMARY

The following specification provides for a software download over SHDSL. This summary is made by way of example and not by way of limitation. It is merely provided to aid the reader in understanding some aspects of at least one embodiment described in the following specification.

System and methods for High-speed Digital Subscriber Line Software Download are provided. In one embodiment, a Digital Subscriber Line (DSL) Transceiver Unit is provided. The transceiver unit comprises at least one DSL transceiver, wherein the at least one DSL transceiver implements an Embedded Operations Channel (EOC) and a data path over at least one DSL pair; a first memory for storing a software file for transfer over the DSL pair, wherein the software file comprises a header and at least one file record; and a second memory for storing a provisioning table, wherein the provisioning table establishes timeslot allocations for a plurality of channels communicated over the data path, including provisions for a software download channel for transmitting the software file from the first memory to a target unit over the data path.

DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide for a new software download mechanism for a Digital Subscriber Line (DSL) system which allows download of system software revisions via a Single-Pair High-Speed Digital Subscriber Line (SHDSL or G.SHDSL) data path. This greatly improves download times by an order of magnitude or more over existing upgrade means. New versions of a file can be sent from a central office to doubler units (also referred to herein as regenerator units) and remote units by encoding the software file as payload on the G.SHDSL link. Software download involves taking a firmware file on a SHDSL Transceiver Unit at the Central Office (STU-C) and downloading the file over the G.SHDSL link to a target unit, which may be an SHDSL Transceiver Unit at the Remote End (STU-R) or an SHDSL Regenerator Unit (SRU). In one embodiment, software download in the data path involves downloading a firmware file over the payload area of a G.SHDSL frame. The payload area of a G.SHDSL frame is normally reserved for transport of user and application port data. In one embodiment of the present invention, a dedicated download channel is created within the data path that coexists with other payload channels (for example, E1 or Ethernet channels), without interfering with their operation. In another embodiment, a dedicated download channel utilizes the entire G.SHDSL payload area. This embodiment provides an extremely fast download, but is service affecting when in operation. Both embodiments are described in greater detail below.

The firmware file involved in system software downloads is typically executable code created for the target. Each firmware file has various attributes associated with it in a header, including a version number and CRC polynomial which is used to confirm file integrity upon download completion. Each file is divided into a sequence of records and sub records to make the download more manageable. For example, in one embodiment, maximum packet size is 64 bytes. Each record is assigned a unique record number, which is sent with the record during download. A record also contains a CRC polynomial, allowing the receiver to check for errors and report to the sender.

Figure 1:
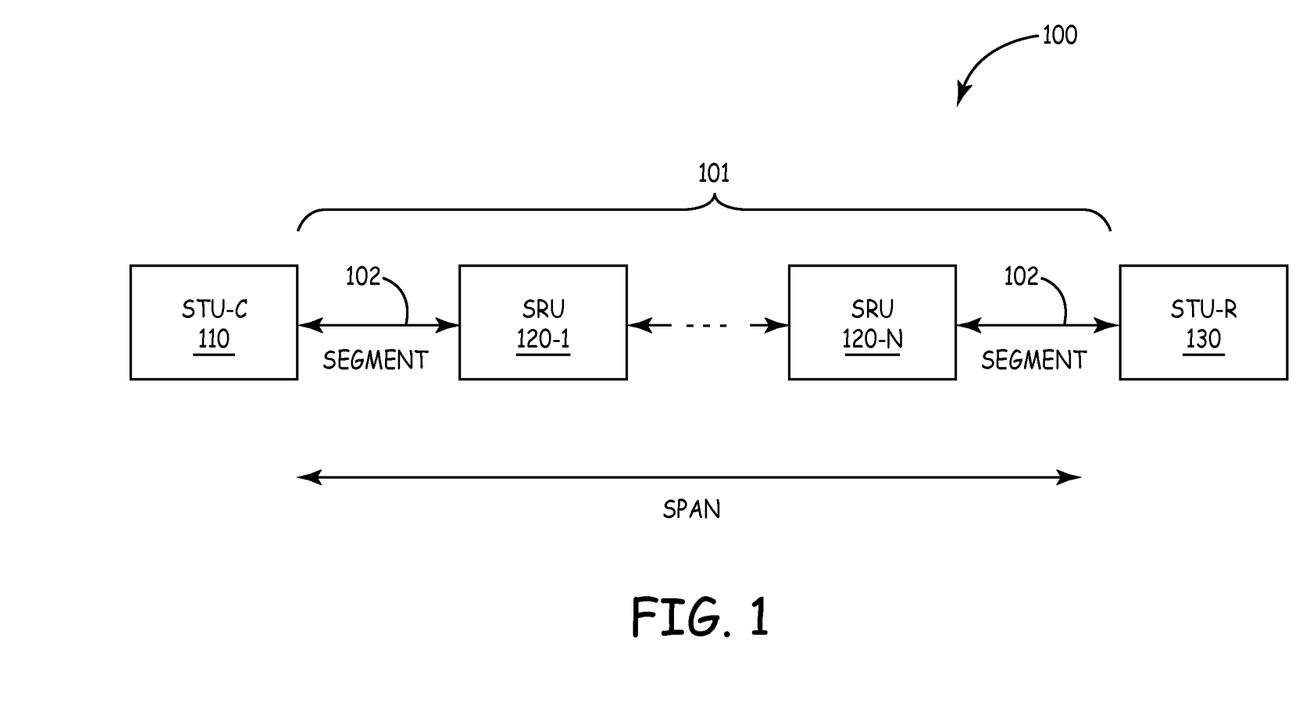
FIG. 1 is a block diagram of an SHDSL Transceiver Unit (STU) span for implementing one embodiment of the present invention.

FIG. 1 is a block diagram of an SHDSL Transceiver Unit (STU) span 100 for implementing one embodiment of the present invention. The span 100 comprises a plurality of units connected via wires of a telephone network capable of supporting G.SHDSL or SHDSL. These units at least include an SHDSL Transceiver Unit at the Central Office (STU-C) 110 and an SHDSL Transceiver Unit at the Remote End (STU-R) 130. The span 100 includes an end-to-end link 101 between the STU-C 110 and the STU-R 130. As shown for the embodiment of FIG. 1, the span 100 can also optionally include one or more SHDSL Regenerator Units (SRU) shown at 120-1 through 120-N to make up link 101. In general, an SRU (such as SRU 120-1, for example) functions to increase the possible range of the span 100 by retransmitting signals it receives down link 101. The SRUs 120-1 through 120-N function bidirectionally and can simultaneously retransmit signals in either direction. The SHDSL standard supports up to eight SRUs in a single span 100. Other DSL standards support other numbers of SRUs in a single span 100. In one embodiment, although the G.SHDSL standard supports eight SRUs, the span 100 implements only two SRUs. However, embodiments of the present invention can include any number of SRUs within span 100, including no SRUs.

Embodiment of the present invention provide systems and methods for transferring a software file located on a sending unit (such as STU-C 110) over the SHDSL link 102 to a target unit, which may be the STU-R 130 or one of the SRU 120-1 to 120-N. Software requirements for an STU-R are typically different from those of an SRU, so the STU-R 130 and the SRU 120-1 usually have their software downloaded separately. Therefore, each unit in a span has its software upgrades downloaded separately. For example, when the STU-C 110 is downloading a software update to the STU-R 130, the SRU 120-1 does not download that software update but instead performs normal operations by passing (or retransmitting) messages. As used in this specification, the terms "firmware" and "software" are synonymous and refer to an executable unit created to run on the target.

In other embodiments, one or more repeaters (not shown) are connected to the span via the DSL link 102. The data path to the one or more repeaters is also configured to implement a software download to the one or more repeaters from either the STU-C 110 or the STU-R 130.

In order to upgrade the units with new software, one embodiment involves downloading a firmware file on the STU-C 110 over the SHDSL link 102 to a target unit, which may be the STU-R 130 or an SRU 120-1. A firmware file is an executable unit created for the target. Software requirements for an STU-R are typically different from those of an SRU, so the STU-R 130 and the SRU 120-1 usually have their software downloaded separately. In other words, the software in the SRU 120-1 will not work in the STU-C 110 or in the STU-R 130. The STU-C and STU-R software versions are often the same, but do not have to be.

Figure 2:
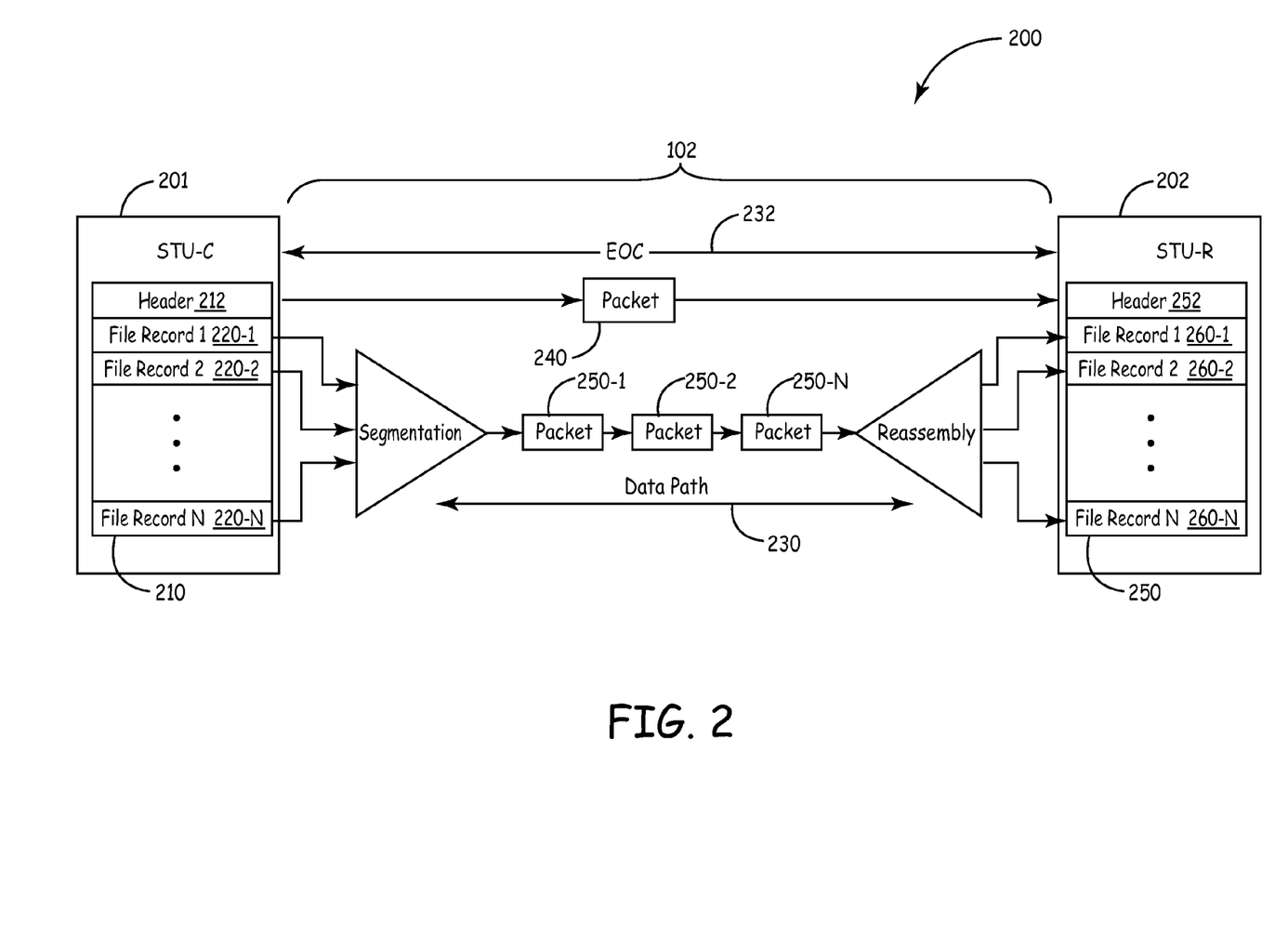
FIG. 2 is a block diagram of one embodiment of the present invention of a software download mechanism over an SHDSL link.

FIG. 2 is a block diagram illustrating a software download originating from an STU-C 201 with to a target STU-R 202. Although FIG. 2 illustrates an STU-C 201 connected directly to an STU-R 202, it would be understood by one of ordinary skill in the art upon reading this specification that one or more intervening SRUs (such as SRUs 120-1 to 120-N) may exists between STU-C 201 and STU-R 202 without consequence to the following description. In other embodiments, the target for the software download may be an SRU. In that case, the target SRU would receive the download file in the same manner as described below for STU-R 202. In still other embodiments, a software "upload" (that is, a transfer to STU-C 201 for example) may be performed as described below with the file sending functioning in the manner described for STU-C 201 and the file receive functioning in the manner described for STU-R 202.

Embodiments of the present invention enable STU-C 201 to provide a software download of a file 210 to STU-R 202 by utilizing data path 230. That is, software upgrades are sent from the STU-C 201 to the STU-R 202 by encoding the software file as a payload on data path 230. Utilization of data path 230 for the software download improves download time over previous download methods. As described above, embodiments of the present invention provide two options for software downloads. Option 1 creates a dedicated channel within data path 230 to be configured for the software download that does not consume the entire bandwidth of data path 230. Option 1 allows any existing service running over the SHDSL link 102 to be maintained (that is, this option coexists with other payload channels), but provides a lower overall throughput than the second option. Option 2 is a dedicated download that uses the entire bandwidth of data path 230 for downloading. Option 2 provides an extremely fast download, but affects any services currently running over data path 230.

In one embodiment, in operation, file 210 is stored on the STU-C 201. As shown in FIG. 2, file 210 is divided into a header 212 and a plurality of records 220-1 through 220-N. The header 212 includes a version number and a cyclic redundancy check (CRC) polynomial which is used to confirm the file integrity on completion of the download. Dividing the file 210 into records 220-1 to 220-N makes downloading the file 210 more manageable due to the smaller size of each record 220-1 to 220-N. Each record 220-1 to 220-N is assigned a unique record number, which is sent with the record 220-1 to 220-N during download. Each record 220-1 to 220-N also contains its own CRC polynomial that allows the target to check for errors and report to the sender. The records 220-1 to 220-N may themselves be further sub-divided. The packet size of each record 220-1 to 220-N will be determined based on the particular capabilities of the system being used. In one embodiment, the maximum packet size is 64 bytes.

As explained further with respect to FIG. 3 below, the header 212 will be downloaded as a data packet 240 via the EOC 232. The file records 220-1 to 220-N are segmented into a plurality of packets 250-1 to 250-N and transmitted over the data path 230. The data packets 250-1 through 250-N are reassembled and stored at the destination address on the STU-R 202 as file records 260-1 through 260-N.

Figure 3:
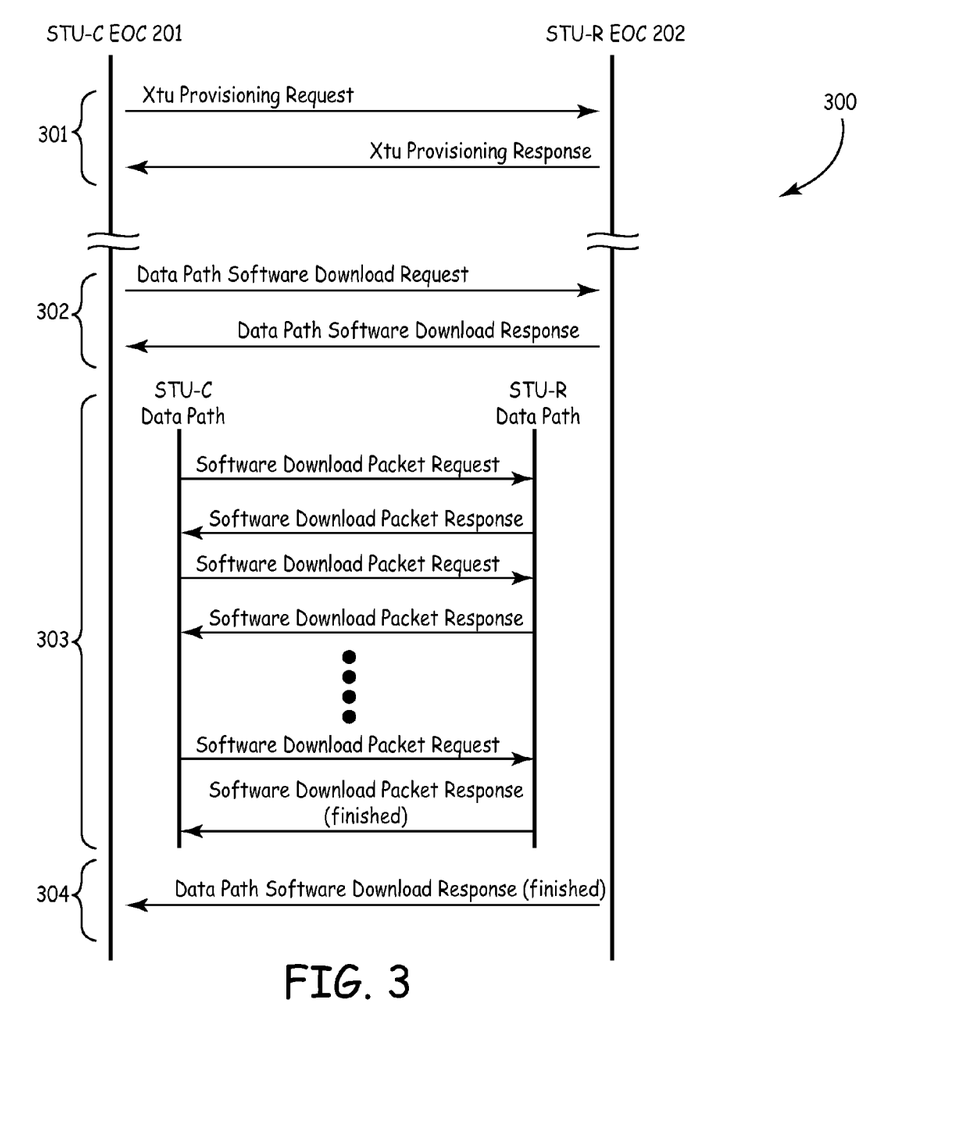
FIG. 3 is a diagram of one embodiment of a system data flow between an STU-C and an STU-R during a successful software download from the STU-C to the STU-R.

FIG. 3 is a diagram illustrating one embodiment of a data flow 300 between STU-C 201 and an STU-R 202 (assuming a successful software download without errors). The software download illustrated by data flow 300 may be discussed in terms of four phases. Phase 1 (301) includes communications over the EOC 232 that perform the initial channel set up of the DSL line. Phase 2 (302) includes communications over the EOC 232 that coordinate the download and uses the existing EOC messaging channel. This involves the sender telling the receiver that it is just about to send a file, by providing the file level details in the file header, which include firmware version number and number of records. Phase 3 (303) includes communications over data path 230 for exchanging file records 220-1 to 220-N based on the initial channel set up of the DSL line established in Phase 1 (301). Finally, Phase 4 (304) provides for reporting a response to STU-C 201 at the end of the download as to whether the download has been successful or not. Each of these phases is discussed in greater detail below.

In Phase 1 (301), an initial channel is set up by identifying and reserving a software download channel. Phase 1 can occur any time prior to a software download, when provisioning for the DSL link 102 is initially set up. As would be appreciated by one of ordinary skill in the art, a DSL link 102 may be established for extended durations of time. Thus Phase 1 may occur years before Phase 2 is entered. Phase 1 (301) comprises an XTU Provisioning Request and an XTU Provisioning Response. As used herein, "XTU" is a generic term used for any type of transceiver unit. For example, as would be appreciated by one of ordinary skill in the art upon reading this specification, two of the transceiver units in an SHDSL system (ITU-T G.991.2) are the STU-C and the STU-R, while two of the transceiver units in an HDSL system (ITU-T G.991.1) are a network termination unit (NTU) and a line termination unit (LTU). Therefore, XTU is used herein to name messages that could be used generically in a number of systems. This example will proceed using STU-C 201 as the sending unit and STU-R 202 as the receiving unit.

In Phase 1, the sending unit STU-C 201 sends an XTU Provisioning Request to the receiving unit STU-R 202. The XTU Provisioning Request establishes timeslot allocations for each channel communicating on link 102 including provisions for the software download channel. The STU-R 202 returns an XTU Provisioning Response to the STU-C 201 acknowledging that the channel timeslot allocations are identified and reserved. As would be appreciated by one of ordinary skill in the art upon reading this specification, an XTU Provisioning Request is part of the normal provisioning between an STU-C and an STU-R, which typically occurs during system startup. With embodiments of the present invention, the XTU Provisioning Request is modified to include information for allocating a software download channel. There is no timing connection between the XTU Provisioning Request messages and any subsequent software download. This means that a software download may be performed weeks, months, or even years after Phase 1 is completed. Subsequent XTU Provisioning Requests may also be transmitted to implement changes to the system configuration (for example, reallocate time slots).

Table 1 gives an exemplary XTU Provisioning Request Message. Before discussing the specifics of Table 1 and the subsequent tables that follow, an explanation of the tables' substance and format is illustrative. First, the tables list octal values on the left column and functions correlated with the octal values on the right column. Second, all messages sent over an SHDSL link have a header with the same format. One standard for EOC messages comprise a message identification (Id) field to indicate the type of message. Proprietary messages use the message Id field to indicate "proprietary" and a Sub Id field to indicate which "proprietary" message it is. There are two types of proprietary message, including a proprietary request indicated by message Id 112 and a proprietary response indicated by message Id 240.

Table 1 shows an example of an XTU Provisioning Request that includes provisions for line communication channels at octets 4-19 and for a software download channel at octets 20 and 21. Once an actual software download is initiated in Phase 2, for implementing Option 1, octet 20 identifies the number of timeslots allocated for the software download channel and octet 21 indicates the starting position of the channel within the DSL frame. Alternately, for Option 2, then the entire payload is used for software download which is provisioned by setting octets 20 and 21 both to zero.

TABLE 1

| | Sync Pattern (value = 7E Hexidecimal) Source Address Bits   Destination Address 3 . . . 0 7 . . . 4 |
|---|---|
| 1 | Message Id 112 Proprietary Request |
| 2 | DSL Pair |
| 3 | Message Sub Id 13 XTU Provisioning Request |
| 4-19 | Existing line unit provisioning data |
| 20 | Software Download Channel Number of Timeslots |
| 21 | Software Download Channel Beginning Timeslots Frame Check Sequence (FCS) byte 1 FCS byte 2 Sync Pattern (value = 7E Hexadecimal) |

Figure 4:
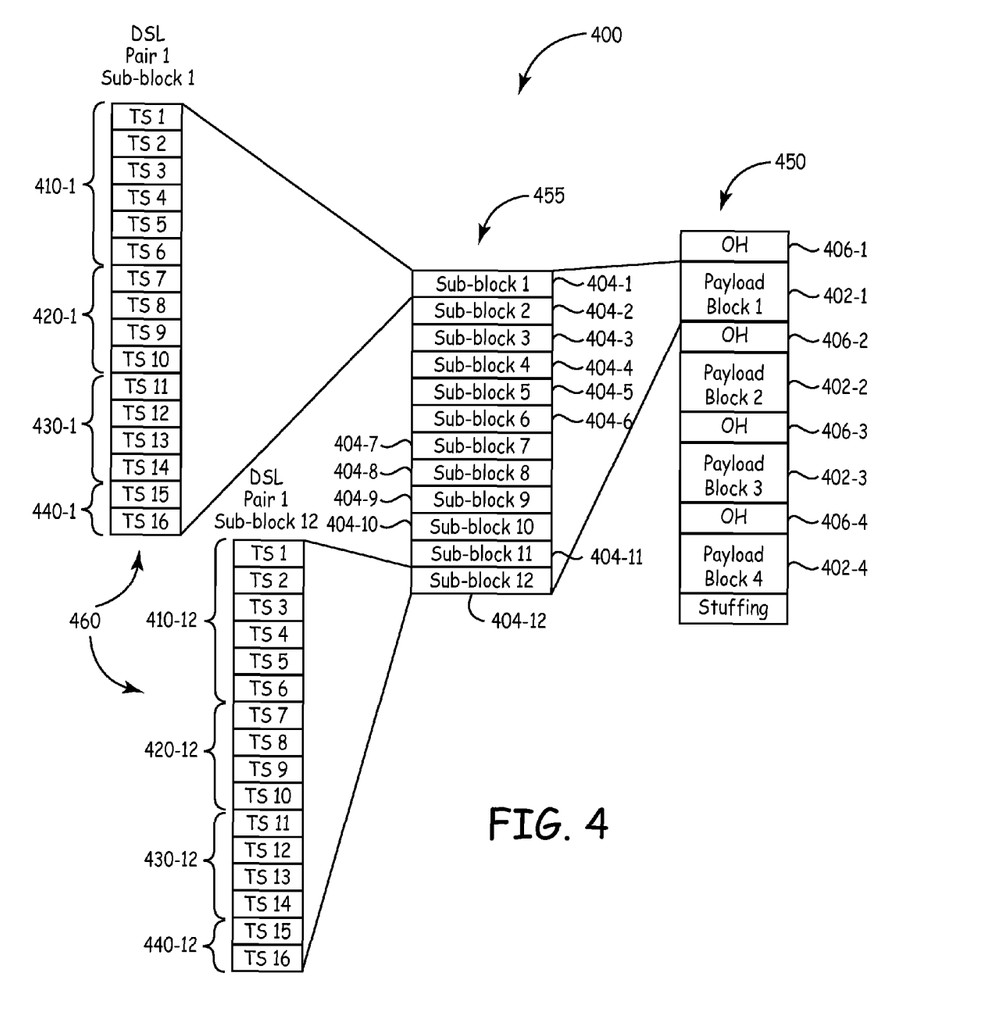
FIG. 4 is a block diagram of one embodiment of an XTU provisioning timeslot allocation for a single pair DSL configuration.

The allocation of timeslots set up by an XTU Provisioning Request for one embodiment is illustrated in FIG. 4 generally at 400. As shown generally at 450, transmissions over the data path 230 comprise payload blocks (shown generally at 402) that are separated by overhead messages (shown generally at 406). Each overhead message 406 is a certain number of bytes long that differentiates blocks 402 from each other, as well as carrying additional information such as alarms, EOC information, error checking, and the like. As shown generally at 455, in this particular embodiment, each payload block 402 further comprises twelve sub-blocks 404-1 to 404-12. In turn, each of the sub-blocks 404-1 to 404-12 comprises sixteen timeslots. In other embodiments, a payload block 402 may comprise a greater or fewer number of sub-blocks and each sub-block may contain a greater or fewer number of time slots.

Shown generally at 460, the number of timeslots allocated to each channel (for example, E1, Ethernet) on the DSL line is configurable based on factors such as the desired interface and bandwidth requirements of the user. In the example of FIG. 4, an E1 channel is allocated 6 timeslots (shown as TS 1-TS 6 at 410-1 and 410-12). An Ethernet channel is allocated 4 timeslots (shown as TS 7-TS 10 at 420-1 and 420-12). An Nx64 channel has 4 timeslots allocated (shown as TS 11-TS 14 at 430-1 and 430-12). Accordingly, octets 4-19 of the XTU Provisioning Request shown in Table 1 would indicate that E1 is allocated 6 timeslots beginning at timeslot 1 (6,1), Ethernet is allocated 4 timeslots beginning at timeslot 7 (4,7), and Nx64 is allocated 4 timeslots beginning at timeslot 11 (4,11). In the embodiment illustrated by FIG. 4, a software download channel is allocated 2 timeslots (shown at TS 15-TS16 at 440-1 and 440-12) shown at 440-1 and 440-12. Accordingly, octet 20 of the XTU Provisioning Request shown in Table 1 would indicate that the software download channel is allocated 2 timeslots and octet 21 would indicate that the software download channel beginnings at timeslot 15 (2,15). Although allocations for sub-blocks 404-1 and 404-12 are specifically illustrated, one of ordinary skill in the art upon reading this specification would appreciate that sub-blocks 404-2 to 404-11 would have the same allocations as 404-1 and 404-12.

The particular embodiment shown in FIG. 4 implements Option 1. That is, a software download may occur concurrently with transmissions on the E1, Ethernet and Nx64 channels because the software download channel does not utilize any timeslots allocated to those other channels. If Option 2 were implemented (for example, by setting octets 20 and 21 both to zero) then during normal operation, the E1, Ethernet and Nx64 channels would operate over the timeslots allocated to them, as shown at 460. Then, when a software download is initiated (discussed below in Phase 2), the software channel would assume all 16 timeslots (TS 1-16) for the duration of the software download. The E1, Ethernet and Nx64 channels would effectively be off during this period. Once the software download was completed, the E1, Ethernet and Nx64 channels would resume communication over their allocated timeslots.

The more timeslots that are allocated to the software download channel 440, the faster data packets can be sent. For DSL systems having two or more pairs, the timeslot allocation becomes more complicated due to interleaving bytes, but one of ordinary skill in the art upon reading this specification would appreciate that the teachings of this specification would apply to such configurations equally well.

Returning to FIG. 3, Phase 2 (302) involves communicating over the EOC messaging channel 232 to initiate and coordinate a software download. A Data Path Software Download Request is sent by STU-C 201 over the EOC channel 232 to the target STU-R 202. The Data Path Software Download Request, illustrated in Table 2, includes information from the file header 212 of file 210, such as a firmware version number, the number of the file records (220-1 to 220-N) that will be sent and a checksum for file 210. The Download Request is thus the first message sent to initiate a software download. As shown in Table 2, STU-C 201 will insert a Destination Address associated with the target transceiver unit (i.e., STU-R 202 in this example) into the Data Path Software Download Request.

Table 2 shows an exemplary Data Path Software Download Request. Octet 4 sets the Software Download Mode. A value of 01 tells the target that the software download will take place over the software download channel as provisioned by the XTU Provisioning Request. For example, if the XTU Provisioning Request provisioned Timeslots TS 15 and TS 16 for the software download channel, then Octet 4 value of 01 notifies the target that the file records 220-1 to 220-N will arrive over timeslots TS 15 and TS 16, and that the other channels (E1, Ethernet and Nx64, for example) will not be disturbed. In other words, this would implement Option 1. In contrast, an Octet 4 value of 02 tells the target to override the provisioning of the XTU Provisioning Request. Instead, the entire DSL payload frame will be dedicated to the software download. In other words, an Octet 4 value of 02 forces Option 2. In one embodiment, if Octet 4 is set to 02, Octet 4a is used to indicate the number of timeslots that will be used for the software download. In one embodiment, if octet 4 is set to 01 (Option 1), then octet 4a is not present.

In one embodiment, the target STU-R 202 will review the version number of the file STU-C 201 is requesting to transfer. If the version number is the same as, or an earlier version than the software currently resident within STU-R 202, then STU-R 202 will refuse STU-C's 201 software download request. This is to prevent outdated software from being installed. However, in some cases, the system operator will want to reload an earlier software version, or reload the current version. This may occur when a bug or error is identified in the current version and functionality needs to be restored quickly. For such occasions, octet 5 initiates a Force Mode. If the file software version given in the download header is the same (or an earlier) version as the currently executing firmware file on the target, then Force Mode indicates whether the target should accept the software download regardless of its version number. For Example, in one embodiment, a value of 00 in octet 5 allows the target to reject software having the same or earlier version number. A value of 02 in octet 5 instructs the target not to reject software having the same or earlier version number. A value of 02 in octet 5 forces the target to accept the download and reload the same (or earlier) version of the software.

Data Path Software Download Request octets 6-69 contain information about the file to be downloaded from Header 312, such as a file checksum, the number of records, and the like.

TABLE 2

| | Sync Pattern (value = 7E Hexidecimal) |
|---|---|
| | Source Address Bits   Destination Address 3 . . . 0 |
| | 7 . . . 4 |
| 1 | Message Id 112 Proprietary Request |
| 2 | DSL Pair |
| 3 | Message Sub Id 18 Data Path SW Download |
| 4 | Software Download Mode (01 or 02) |
| 4a* | Number of Timeslots |
| 5 | Force Mode (00 or 02) |
| 6-69 | Download File Header |
| | FCS byte 1 |
| | FCS byte 2 |
| | Sync Pattern (value = 7E Hexadecimal) |

In response, a Data Path Software Download Response is sent by the STU-R 202 accepting or rejecting the download. Like the Data Path Software Download Request message, the Data Path Software Download Response is sent as standard HDLC formatted EOC messages over EOC channel 232. Table 3 shows an exemplary Data Path Software Download Response. Octet 4 indicates the status of the download. 01 indicates the system is ready for download and 255 indicates the system is unable to comply.

TABLE 3

| | Sync Pattern (value = 7E Hexidecimal) |
|---|---|
| | Source Address Bits   Destination Address 3 . . . 0 |
| | 7 . . . 4 |
| 1 | Message Id 240 Proprietary Response |
| 2 | DSL Pair |
| 3 | Message Sub Id 12 Software Download Response |
| 4 | Status (01 or 255) |
| 5 | FCS byte 1 |
| 6 | FCS byte 2 |
| | Sync Pattern (value = 7E Hexadecimal) |

As indicated below, a Data Path Software Download Response would typically be sent twice during a software download. The first time would be at the end of Phase 2 to indicate that the target STU-R 202 is ready to receive a software download on the data path 230. The second time would be at the end of Phase 4, to indicate the result of the complete download.

Phase 3 (303) involves the actual transfer of the File Records 220-1 and 220-N via data path 230. The transfer will occur either as software download concurrently with transmissions on other channels (i.e., Option 1) or by dedicating the entire DSL payload frame to the software download (i.e., Option 2). Messages in Phase 3 are formatted as EOC messages (as shown in Tables 4 and 5 below), except they are sent over the time division multiplex (TDM) timeslots in of data path 230. In one embodiment, the messages are High-Level Data Link Control (HDLC) byte encoded and include a source and destination address. The destination address is assigned by the sender and has the same destination address value used on the equivalent EOC channel.

Table 4 illustrates an exemplary Software Download Packet Request sent by STU-C 201 to STU-R 202 over data path 230. In one embodiment, each Software Download Packet Request includes a 64 byte segment of the file 210 to be transferred. Assuming no errors occur, Software Download Packet Request messages are repeatedly sent until the file 210 has been completed transferred to STU-R 202. Each instance of a Software Download Packet Request requires an explicit acknowledgement from the target to verify that the 64 byte segment of the file 210 was completely and accurately transferred. To facilitate this verification, Octets 6 and 7 of the Software Download Packet Request message contains a checksum value for the 64 bytes segment carried by the Software Download Packet Request. This checksum value is used by the target to verify data integrity for that Software Download Packet Request.

TABLE 4

| | Sync Pattern (value = 7E Hexidecimal) Source Address Bits   Destination Address 3 . . . 0   7 . . . 4 |
|---|---|
| 1 | Message Id 112 Proprietary Request |
| 2 | DSL Pair |
| 3 | Message Sub Id 13 Software Download Packet Request |
| 4 | Record Number |
| 5 | Sub Record Number |
| 6 | Packet Checksum Byte 1 |
| 7 | Packet Checksum Byte 2 |
| 8-72 | 64 bytes of download record data |
| 73 | FCS byte 1 |
| 74 | FCS byte 2 |
| | Sync Pattern (value = 7E Hexadecimal) |

The entire file is thus downloaded to the target over the data path 230. In response to each Software Download Packet Request, the target STU-R 202 sends a Software Download Packet Response to the sender STU-C 201 either accepting or rejecting the 64 byte segment download. If the download is accepted, the sender sends the next corresponding segment via a Software Download Packet Request. In one embodiment, if the download is not accepted, the target STU-R 202 sends a Software Download Packet Response reporting a download failure and the software download is aborted.

Table 5 illustrates an exemplary Software Download Packet Response. Octet 5 indicates the status of the download based on the previously received Software Download Packet Requests. An octet 5 value of 00 indicates the software download is complete (finished). An octet value of 01 notifies STU-C 201 that the last Software Download Packet Request successfully transported its software segment and requests the STU-C 201 to proceed with sending the next Software Download Packet Request. An octet value of 02 indicates that an error has occurred and the software download is aborted.

TABLE 5

| | Sync Pattern (value = 7E Hexidecimal) Source Address Bits   Destination Address 3 . . . 0   7 . . . 4 |
|---|---|
| 3 | Message Id 240 Proprietary Response |
| 4 | Message Sub Id 13 Software Download Packet Response |
| 5 | Status |
| 6 | FCS byte 1 |
| 7 | FCS byte 2 |
| | Sync Pattern (value = 7E Hexadecimal) |

Phase 4 (304) provides for reporting a response to STU-C 201 at the end of the download as to whether the download has been successful or not. The target STU-R 202 transmits a second Data Path Software Download Response (as shown in Table 3) to the STU-C 201 over the EOC 222 to report the success or failure of the entire download to the sender. This Phase 4 Data Path Software Download Response includes either a positive acknowledgement or error report in the EOC channel to the sender to indicate if the entire file was received successfully. In one embodiment, the target STU-R 202 calculates a checksum for the entire downloaded software file and verifies it against the file checksum provided by the Header 212 in the Data Path Software Download Request. If the checksums do not match, then the target STU-R 202 communicates a download failure via the Phase 4 Data Path Software Download Response.

Figure 5:
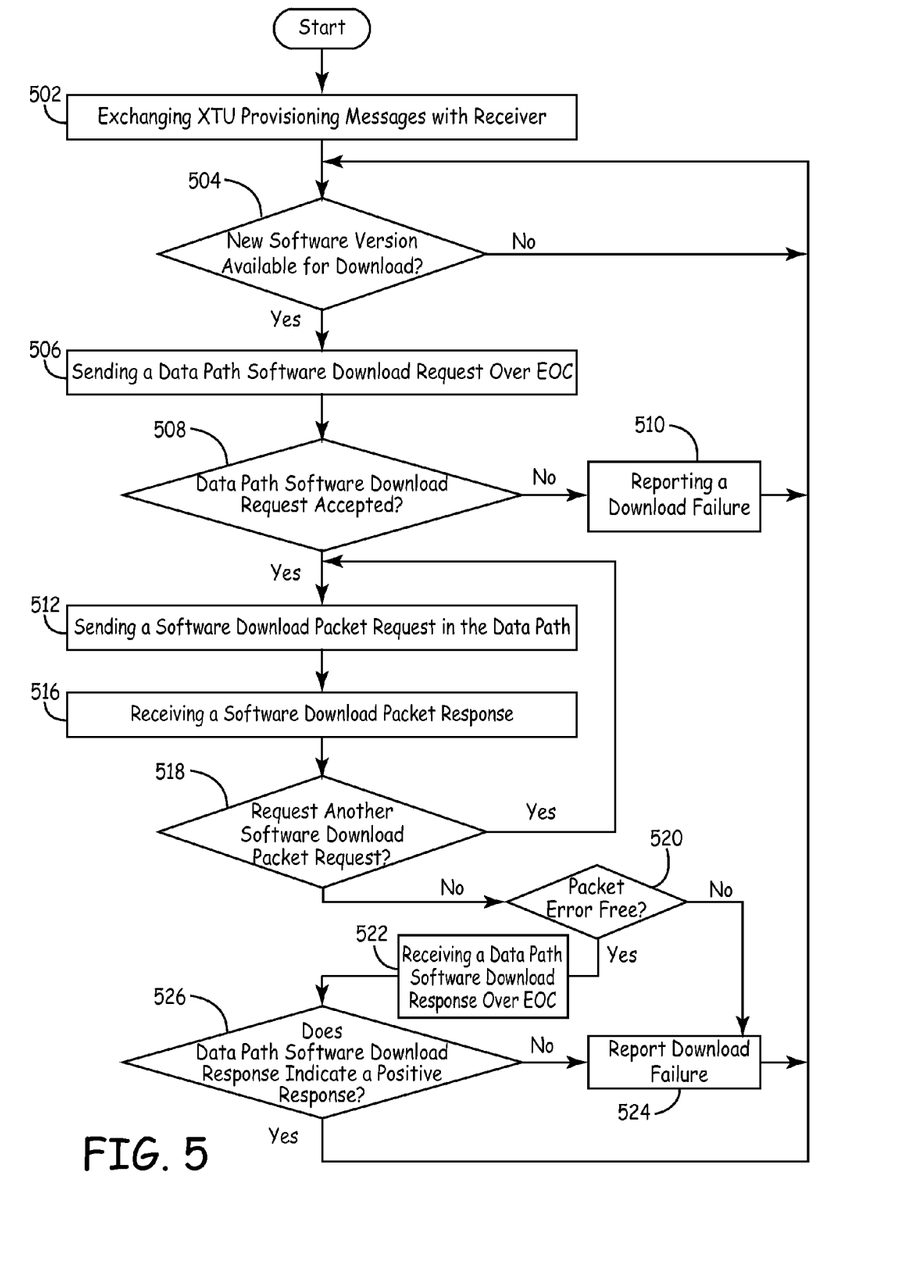
FIG. 5 is a flow chart of one embodiment of the present invention of a sender process.

FIG. 5 is a flow chart illustrating a method of one embodiment of the present invention implemented by a sender transceiver unit. The method of FIG. 5 allows a sender DSL transceiver to provide a software download of a file to a DSL receiver by utilizing time slots of the DSL data path rather than the EOC. For exemplary purposes, the sender process is described with an STU-C being the software sender and an STU-R being the software receiver. However, in other embodiments, the STU-R will be a sender and the receiver will be either an STU-C or an SRU. That is, software upgrades are sent from the STU-C to the STU-R by encoding the software file as a payload on the data path. Utilization of the data path for the software download improves download time over previous download methods via the EOC. As described above, embodiments of the present invention provide two options for software downloads. Option 1 creates a dedicated channel within data path to be configured for the software download that does not consume the entire bandwidth of the data path. Option 1 allows any existing service running over the DSL link to be maintained but provides a lower overall throughput than the second option. Option 2 is a dedicated download that uses the entire bandwidth of the data path for downloading. Option 2 provides an extremely fast download, but affects any services currently running over the data path.

The process begins at 502 in phase 1 with the exchanging an XTU Provisioning Messages over an EOC. As explained above, the XTU Provisioning Request establishes timeslot allocations for each channel communicating on the DSL link including provisions for the software download channel. The STU-R returns an XTU Provisioning Response to the STU-C acknowledging that the channel timeslot allocations are identified and reserved.

Once provisioning is completed, the process proceeds to 504 with determining when a new software version is available for download to one or more targets.

When there is a new software version available (determined at 504) the process proceeds to 506 with sending a Data Path Software Download Request over the EOC to the target unit. For example, a Data Path Software Download Request is sent by the STU-C over the EOC channel to the target STU-R. The Data Path Software Download Request (such as illustrated in Table 2) includes information from the file header of the file to be transferred such as a firmware version number, the number of the file records that will be sent and a checksum for file. As shown in Table 2, in one embodiment, the STU-C will insert a Destination Address associated with the target into the Data Path Software Download Request. Thus any intervening devices between the sender and the target will simply pass the messages through.

The process proceeds to 508, where the sender determines whether a Data Path Software Download Request is accepted. In one embodiment, this is determined based on the receipt of a Data Path Software Download Response over the EOC. If the Data Path Software Download Request is not accepted, the process proceeds to 510 with reporting a download failure and the download attempt is aborted. The download failure may be reported to a user. The target may reject a Data Path Software Download Request, for example, when the version number of the intended software download is earlier than or equal to currently installed software. In such a case, a Data Path Software Download Request may force acceptance by the target of the download as described above. In one embodiment, not receiving a Data Path Software Download Response within a timeout period is treated as an error and the method proceeds to 510.

When the Data Path Software Download Request is accepted (determined at 508), the process proceeds to 512 (and enters Phase 3) with sending a Software Download Packet Request in the data path. In one embodiment, the sending unit resets an index number indicating the record and a number indicating the sub-record to 0 as the first packet is sent. Once the packet is received, the index number is incremented.

After the packet is sent to the STU-R, the method proceeds to 516 with receiving a Software Download Packet Response from the STU-R. A Software Download Packet Response may indicate 1) that the software download is complete, 2) that the last Software Download Packet Request successfully transported its software segment and requests the STU-C to proceed with sending the next Software Download Packet Request, or 3) that an error has occurred and the software download is aborted.

When the Software Download Packet Response requests the STU-C to proceed with sending the next Software Download Packet Request (determined at 518), the method returns to 512 with sending the next Software Download Packet Request in the data path. When the Software Download Packet Response indicates that an error has occurred (determined at 520), the process proceeds to 524 with reporting a download failure to a user and the download attempt is aborted. In one embodiment, not receiving a Software Download Packet Response within a timeout period is treated as an error and the method proceeds to 524.

When the Software Download Packet Response indicates that that the software download is complete without error, the process proceeds to 522 (entering Phase 4) with receiving a Data Path Software Download Response via the EOC at the end of the download. The Data Path Software Download Response provides for reporting a response to STU-C at the end of the download as to whether the download has been successful or not. Thus, the process proceeds to 526 with determining if the Data Path Software Download Response is positive. This Phase 4 Data Path Software Download Response includes either a positive acknowledgement or error report in the EOC channel to the sender to indicate if the entire file was received successfully. In one embodiment, the target STU-R calculates a checksum for the entire downloaded software file and verifies it against the file checksum provided by the Header in the Data Path Software Download Request. If the checksums do not match, then the target STU-R communicates a download failure via the Phase 4 Data Path Software Download Response. In one embodiment, not receiving a Data Path Software Download Response at the end of the download within a timeout period is treated as an error and the method proceeds to 524.

Figure 6:
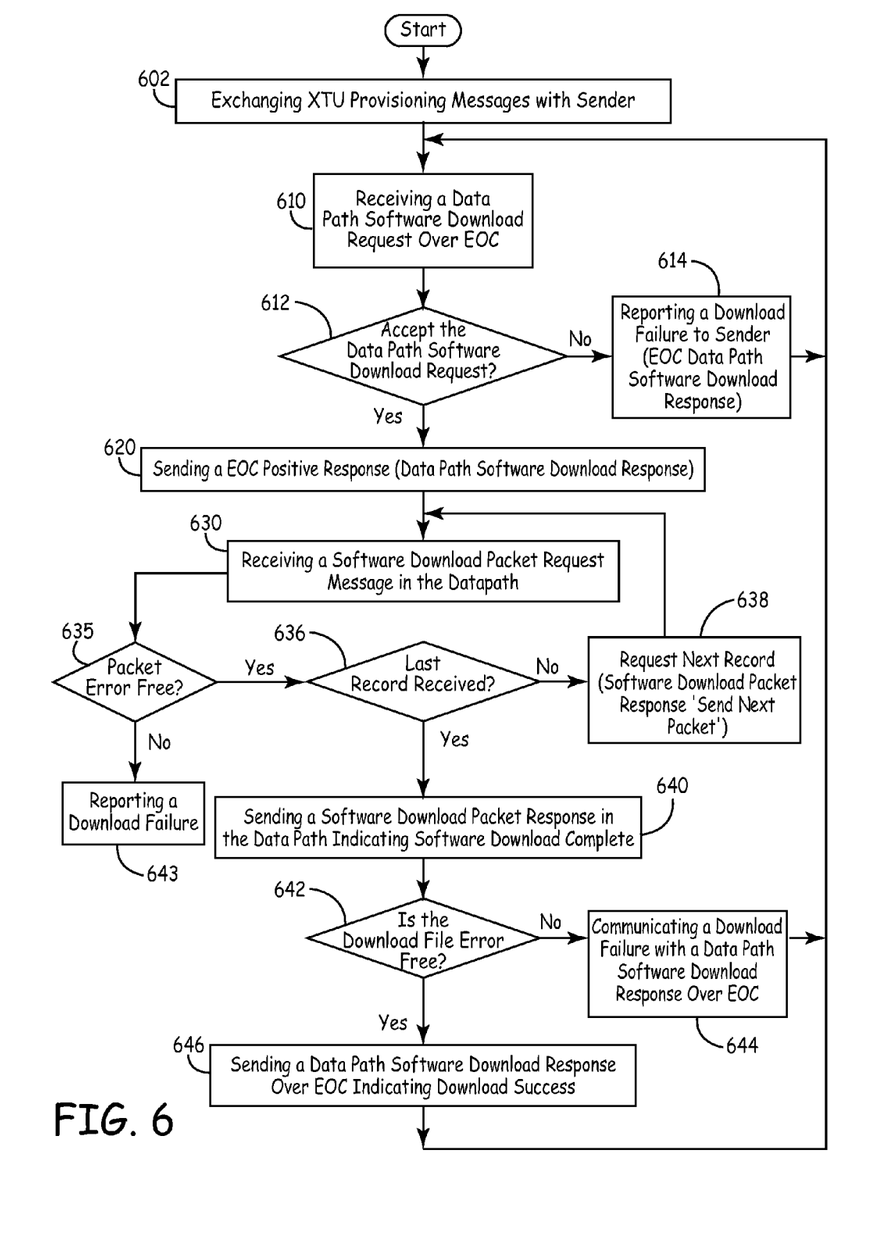
FIG. 6 is a flow chart of one embodiment of the present invention of a receiver process.

FIG. 6 is a flow chart illustrating a method of one embodiment of the present invention implemented by a receiver unit. The method of FIG. 6 allows a sender DSL transceiver to provide a software download of a file to a DSL receiver by utilizing time slots of the DSL data path rather than the EOC. For exemplary purposes, the sender process is described with an STU-C being the software sender and an STU-R being the software receiver. However, in other embodiments, the STU-R will be a sender and the receiver will be either an STU-C or and SRU.

The process begins at 602 with exchanging XTU Provisioning Messages. As explained above, the XTU Provisioning Request establishes timeslot allocations for each channel communicating on the DSL link including provisions for the software download channel. The STU-R returns an XTU Provisioning Response to the STU-C acknowledging that the channel timeslot allocations are identified and reserved.

As described above, embodiments of the present invention provide two options for software downloads. Option 1 creates a dedicated channel within the data path to be configured for the software download that does not consume the entire bandwidth of the data path. Option 1 allows any existing service running over the DSL link to be maintained but provides a lower overall throughput than the second option. Option 2 is a dedicated download that uses the entire bandwidth of the data path for downloading. Option 2 provides an extremely fast download, but affects any services currently running over the data path.

Once provisioning in completed, the process proceeds to 610 with receiving a Data Path Software Download Request over the EOC. The Data Path Software Download Request instructs the receiving unit to prepare for a software download over the data path based on the provisions provided by the XTU Provisioning Request. In one embodiment, the Data Path Software Download Request can override the provisions provided by the XTU Provisioning Request to implement a dedicated download as described above.

The process proceeds to 612 with determining whether to accept the Data Path Software Download Request. If the Data Path Software Download Request is not accepted, the process proceeds to 614 with reporting a download failure to the sender and the download attempt is aborted. In one embodiment reporting a download failure comprises sending a Data Path Software Download Response to the STU-C indicating that the Data Path Software Download Request is not accepted. The target may reject a Data Path Software Download Request, for example, when the version number of the intended software download is earlier than or equal to currently installed software. In such a case, a Data Path Software Download Request may force acceptance by the target of the download as described above. When the STU-R accepts the Data Path Software Download Request, the process proceeds to 620 with sending a Data Path Software Download Response to the STU-C indicating that the Data Path Software Download Request is accepted. At this point, the receiver enters Phase 3 to start receiving the software download via the DSL data path.

The process next proceeds to 630 with receiving a Software Download Package Request message over the data path.

If the software packet received via the Software Download Package Request is free from error (as determined by a CRC or checksum verification at 635) and, based on information from the file header additional Software Download Package Requests are expected (checked at 636), the method proceeds to 638 with sending a Software Download Package Response indicating that the last Software Download Packet Request successfully transported its software segment and requests the sender to proceed with sending the next Software Download Packet Request. If the software packet received via the Software Download Package Request is free from error (as determined by a CRC or checksum verification at 635) and, based on information from the file header is the last expected Software Download Package Request (checked at 636), then the process proceeds to 640 to enter Phase 4 with sending a Software Download Package Response indicting that the software download is complete. If the software packet received via the Software Download Package Request is not free from error (as determined by a CRC or checksum verification at 635) or an expected Software Download Package Request was not received within a timeout period, then the process proceeds to 643 with reporting a download failure to a user.

The method enters Phase 4 at 642 with determining if the downloaded file is error free. In one embodiment, the target calculates a checksum for the entire downloaded software file and verifies it against the file checksum provided by the Header in the Data Path Software Download Request. When the checksums do not match, then process proceeds to 644 with communicating a download failure via a Data Path Software Download Response via the EOC. Otherwise, when the downloaded file is error free, the process proceeds to 646 with sending a Data Path Software Download Response via the EOC indicating a successful software download has been completed.

Figure 7A:
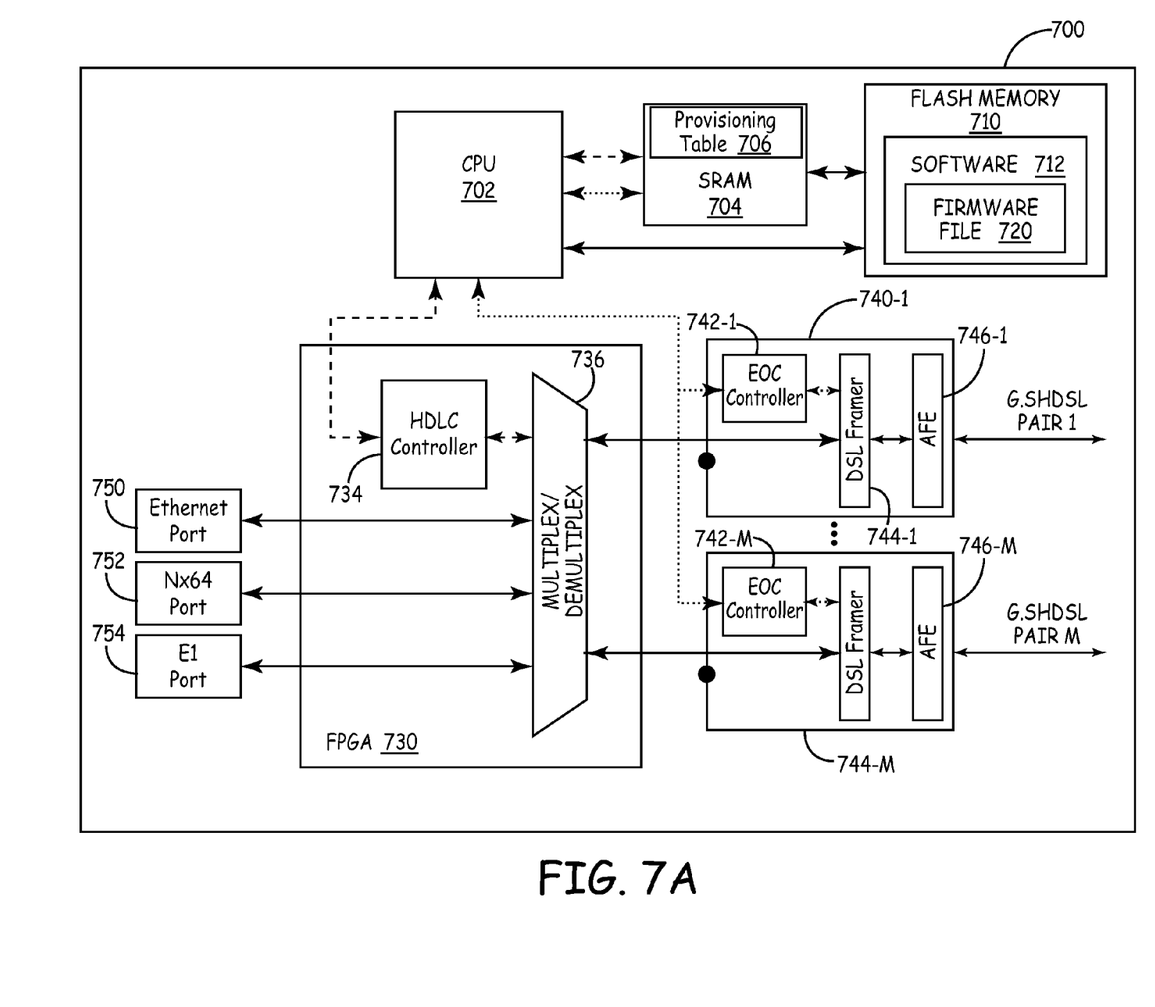
FIGS. 7A and 7B are block diagrams of one embodiment of the present invention of the units in an SHDSL Transceiver Unit (STU) span.

To provide additional details regarding transceiver units as described with respect to FIGS. 1-6, FIGS. 7A and 7B are block diagrams of one embodiment of the present invention of the units in an SHDSL Transceiver Unit (STU) span. FIG. 7A is a block diagram of an STU 700 according to one implementation of the invention. In one embodiment, an STU-C and an STU-R use the same hardware. The role of each STU is dependent upon the software in the STU. In other words, the role of each STU is configurable in the unit's software. Therefore, the embodiment of an STU 700 depicted in FIG. 7A can be either an STU-C or an STU-R.

The STU 700 comprises a central processing unit (CPU) 702, and memories 704 and 710. In one embodiment, the CPU 702 is a microcontroller. In the embodiment of FIG. 7A, the memory 704 is a static random access memory (SRAM) and the memory 710 is a flash memory, although other types of memory may be used. The SRAM 704 comprises a provisioning table 706 that stores provisioning information for setting up the download channel. The CPU 700 is used to implement a firmware file 720 implemented in software 712 that is executed by the CPU 700. Software 712 also comprises application software for the STU 700. At boot-up, the software file is loaded from the flash memory 710 into the SRAM 704 for execution because the flash memory 710 is slower than the SRAM 704.

The firmware file 720 is a firmware upgrade or is where a firmware upgrade is to be stored. For example, if the STU 700 is an STU-C (acting as a server) with an upgrade for an STU-R (acting as a target), the firmware file 720 is the upgrade file. If the STU 700 is an STU-R needing an upgrade, the firmware file 720 will be replaced with the upgrade. When the firmware file 720 is to be downloaded, the firmware file 720 is stored in the flash memory 710 as a separate file and is transferred from the flash memory 710 to the SRAM 704. The firmware file 720 is moved in small parts to the SRAM 704 to construct into packet format.

In one embodiment of the software download, any existing file in the firmware file 720 is overwritten. In this embodiment, if the download fails, the card is effectively corrupted and inoperable. Thus, two memories 704 (such as two flash banks) are implemented in the STU 700. The firmware file 720 is downloaded as a new file on one of the memories 704, which allows the STU 700 to fall back to the old file stored at the destination 720 if the download fails.

The STU 700 further comprises a field programmable gate array (FPGA) 730 and DSL transceivers 740-1 through 740-M. The FPGA 730 comprises a High-Level Data Link Control (HDLC) controller 734 that formats raw frames (without flags, CRC, or stuffing) and inserts the frames into the data path. The FPGA also comprises a multiplexer 736 for multiplexing and demultiplexing signals received. The DSL transceivers 740 each provide a G.SHDSL pair, up to M of pairs, where M is a positive integer. The DSL transceivers 740-1 through 740-M comprise EOC controllers 742-1 through 742-M, DSL framers 744-1 through 744-M, and analog front end (AFE) 746-1 through 756-M, respectively. The DSL framers 744 create a timeslot diagram from individual bit streams in one direction and the bit streams in the opposite direction. The AFEs 746 outputs analog signals from the DSL transceivers 740 that are phase amplitude modulated.

In some embodiments, messages for the data path are partially constructed in the SRAM 704 for the FPGA 730. The messages are not fully constructed in the SRAM 704 because the FPGA 730 outperforms the CPU 702 at certain tasks. The STU 700 is connected to a DSL link via the DSL transceivers 740. The FPGA 730 allows the STU to use the data path of the DSL link for software downloads. During a software download or upload, the CPU 702 communicates with the FGPA 730 and requests from the DSL transceivers 740 for EOC access. The SRU 700 also comprises three user ports. These ports include an Ethernet port 750, an Nx64 port 752, and an E1 port 754. The components of the STU are communicatively coupled to one another as needed using suitable interfaces and interconnects.

FIG. 7A also shows an embodiment of a message flow through the SRU 700. The dashed lines correspond to a data path message flow and the dotted lines correspond to EOC message flow. The message flows will be described in greater detail below with respect to phases of a software download.

Figure 7B:
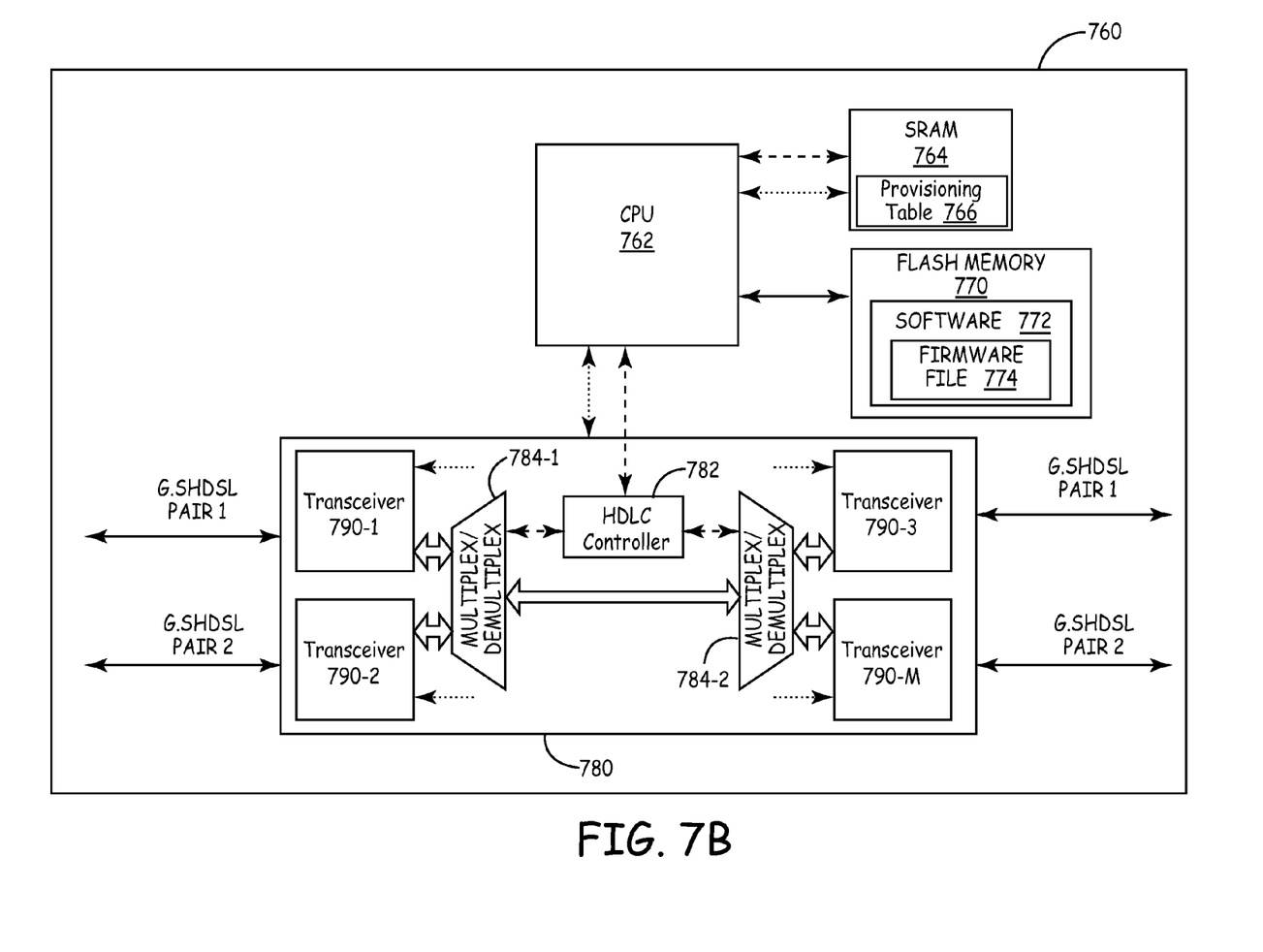

FIG. 7B is a block diagram of an SRU 760 according to one implementation of the invention. Like the STU 700, the SRU 760 comprises a CPU 762, an SRAM 764, and a flash memory 770. The SRAM 764 comprises a provisioning table 766 that contains information relating to a software download channel. The flash memory 770 comprises software 772 that comprises application software for the SRU 760 and a firmware file 774. The SRU 760 is configured to download firmware or software updates from either an STU-C or an STU-R. The firmware file 774 is a destination for such an upgrade using the software download described herein. In one embodiment, the SRU 760 is connected to a STU-C via a DSL link and is also connected to a STU-R via a DSL link.

The CPU 762 communicates with a DSL transceiver 780. The DSL transceiver 780 further comprises an HDLC Controller 782, multiplexers 784-1 and 784-2, and transceivers 790-1 through 790-M. These components perform functions similar to the like components of the STU 700. The transceiver 780 regenerates the received signals. Unlike the STU 700, the SRU 760 does not have Ethernet and E1 user ports. The SRU is bi-directional. The dashed line represents the data path message flow, the dotted line represents the EOC channel message flow, and the wide line represents the payload flow. The components of the SRU 760 are communicatively coupled to one another as needed using suitable interfaces and interconnects.

Embodiments of the software download can also work with technologies besides SHDSL including, but not limited to, High bit rate Digital Subscriber Line (HDSL), Asymmetric Digital Subscriber Line (ADSL) including the ADSL G.992.1 standard, and Very high bit rate Digital Subscriber Line (VDSL) including the VDSL G.993.2 standard.

Suitable storage devices or media 704, 710, 764, and 770 include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices), magnetic disks (such as local hard disks and removable disks), and optical disks (such as Compact Disk-Read Only Memory (CD- ROM) disks). Moreover, the storage devices or media 704, 710, 764, and 770 need not be local to the transceiver units 700 and 760, respectively. Also, the memory 704 and 764 comprise, in one implementation of such an embodiment, any suitable form of random access memory (RAM) now known or later developed, such as dynamic random access memory (DRAM). In other embodiments, other types of memory are used.

This description has been presented for purposes of illustration, and is not intended to be exhaustive or limited to the embodiments disclosed. Aspects described with respect to a particular embodiment may be combined with, or replace aspects of, other embodiments. Variations and modifications may occur, which fall within the scope of the following claims. Therefore, it is manifestly intended that this invention be limited only by the claims and the equivalents thereof.

What is claimed is:

1. A method for downloading software over a Digital Subscriber Line (DSL) data path, the method comprising:
   exchanging provisioning messages with a target unit, the provisioning messages including a provisioning request providing timeslot allocations for a plurality of channels communicated over the DSL data path, the plurality of channels including a software download channel for transmitting a software file of executable instructions for execution by the target unit to upgrade the target unit, wherein the software download channel is not associated with a user port;
   sending a data path software download request over an embedded operations channel (EOC) to the target unit to initiate a software download of the software file;
   determining when a data path software download request is accepted;
   when the data path software download request is accepted, sending one or more software download packet requests in the software download channel of the DSL data path from a DSL transceiver unit to the target unit, the software download packet requests each including at least part of the software file of executable instructions for the target unit; wherein each of the software download packet requests originates at the DSL transceiver unit;
   receiving one or more software download packet responses from the target unit in the software download channel of the DSL data path in response to each of the one or more software download packet requests;
   determining when download of the software file is complete based on the one or more software download packet responses; and
   receiving a data path software download response reporting whether the software file was transmitted to the target unit without error;
   wherein the provisioning request allocates timeslots of a respective sub-block in
   a respective payload block of a DSL frame.

2. The method of claim 1, wherein the provisioning request identifies and reserves a software download channel within the DSL data path; wherein the data path software download request indicates a software download mode for sending the software download packet requests, which each include at least part of the software file of executable instructions, to the target unit.

3. The method of claim 1, wherein the provisioning request identifies and reserves the entire DSL data path for the software download channel;
   wherein the data path software download request indicates a software download mode for sending the software download packet requests, which each include at least part of the software file of executable instructions, to the target unit.

4. The method of claim 1, further comprises:
   receiving a provisioning response from the target unit indicating that the software download channel is identified and reserved.

5. The method of claim 1, further comprising:
   wherein the data path software download request comprises information from a software header of the software file including at least one of the group including a version number, a number of file records, and a checksum for the software file.

6. The method of claim 1, further comprising:
   dividing the software file into a plurality of records; and
   assigning each of the plurality of records a unique identifier.

7. The method of claim 6, further comprising:
   transmitting a software download packet request to the target unit for each of the plurality of records.

8. The method of claim 1, further comprising:
   wherein the data path software download request includes a force mode option instructing the target unit to accept the software download.

9. The method of claim 1, wherein sending one or more software download packet requests in the software download channel of the DSL data path further comprises transmitting to the target unit over time division multiplex (TDM) timeslots in the DSL data path.

10. The method of claim 1, wherein the software file further comprises a cyclic redundancy check (CRC) polynomial.

11. The method of claim 1, wherein the DSL comprises one of a Single-Pair High-Speed Digital Subscriber Line (SHDSL), a High bit rate Digital Subscriber Line (HDSL), a Asymmetric Digital Subscriber Line (ADSL), and a Very high bit rate Digital Subscriber Line (VDSL).

12. A Digital Subscriber Line (DSL) transceiver unit, the transceiver unit comprising:
   at least one DSL transceiver, wherein the at least one DSL transceiver implements an Embedded Operations Channel (EOC) and a data path over at least one DSL pair;
   a first memory for storing a software file of executable instructions for transfer over the DSL pair to a target unit for execution by the target unit to upgrade the target unit, wherein the software file comprises a header and at least one file record; and
   a second memory for storing a provisioning table, wherein the provisioning table establishes timeslot allocations for a plurality of channels communicated over the data path, including provisions for a software download channel of the data path over the at least one DSL pair for transmitting the at least one file record of the software file from the first memory to the target unit over the data path, wherein the DSL transceiver unit is configured to segment the at least one file record into a plurality of packets originating at the DSL transceiver unit for transmission over the software download channel;
   wherein the header of the software file is transmitted from the first memory to the target unit over the EOC;
   wherein the DSL transceiver unit is configured to send a data path software download request over the EOC to the target unit to initiate a software download of the software file;
   wherein the provisioning table establishes timeslot allocations of a respective sub-block in a respective payload block of a DSL frame.

13. The DSL transceiver unit of claim 12, wherein the plurality of channels further includes at least one of the set containing an ethernet channel, an E1 channel, and an Nx64 channel.

14. The DSL transceiver unit of claim 12, further comprising:
   wherein the transceiver unit is one of an SHDSL Transceiver Unit at a Central Office (STU-C) or an SHDSL Transceiver Unit at a Remote End (STU-R); and
   wherein the target unit is one of an STU-C, an STU-R, or an SHDSL Regenerator Unit (SRU).

15. The DSL transceiver unit of claim 12, further comprising a processor, wherein the processor instructs the at least one DSL transceiver to transmit an XTU provisioning request to a target DSL unit.

16. The DSL transceiver unit of claim 15, wherein the XTU provisioning request indicates a number of timeslots allocated for the software download channel and a starting position of the channel within a DSL frame.

17. A Digital Subscriber Line (DSL) transceiver unit, the transceiver unit comprising:
   at least one DSL transceiver, wherein the at least one DSL transceiver implements an Embedded Operations Channel (EOC) and a data path over at least one DSL pair;
   a first memory for storing a firmware upgrade file;
   a second memory for storing a provisioning table, wherein the provisioning table establishes timeslot allocations for a plurality of channels communicated over the data path, including provisions for a software download channel of the data path over the at least one DSL pair for receiving at least one file record of a software file of executable instructions over the data path after receiving a data path software download request over the EOC, wherein the software download channel is provisioned for receiving a plurality of packets originating at a DSL transceiver unit from which the plurality of packets are transmitted, each packet including at least part of the software file;
   a processor, wherein the processor stores the at least one file record of the software file received over the data path and a header of the software file received over the EOC into the first memory;
   wherein the processor executes the software file to update firmware for the transceiver unit; and
   wherein the provisioning table establishes timeslot allocations of a respective sub-block in a respective payload block of a DSL frame.

18. The DSL transceiver unit of claim 17, further comprising:
   wherein the processor is configured to monitor for software download packet requests in the software download channel based on receipt of a data path software download request in the EOC.

19. The DSL transceiver unit of claim 17, wherein the first memory stores a software upgrade that overwrites the firmware for the transceiver unit when the DSL transceiver receives a software download from a sender DSL transceiver unit.

20. The DSL transceiver unit of claim 17, further comprising:
   wherein the processor instructs the at least one DSL transceiver to transmit an XTU provisioning response to a sender DSL transceiver unit in response to a received XTU provisioning request; and
   wherein the at least one DSL transceiver transmits a data path software download response over the EOC to the sender DSL transceiver unit when the at least one DSL transceiver receives a data path software download request from the sender DSL transceiver unit and the processor determines that the data path software download request is accepted.

* * * * *